(12) United States Patent
Sparks et al.

(10) Patent No.: US 8,645,565 B2
(45) Date of Patent: Feb. 4, 2014

(54) METHODS, SYSTEMS, AND COMPUTER READABLE MEDIA FOR THROTTLING TRAFFIC TO AN INTERNET PROTOCOL (IP) NETWORK SERVER USING ALIAS HOSTNAME IDENTIFIERS ASSIGNED TO THE IP NETWORK SERVER WITH A DOMAIN NAME SYSTEM (DNS)

(75) Inventors: Robert J. Sparks, Plano, TX (US); Adam B. Roach, Dallas, TX (US); Byron Campen, Dallas, TX (US)

(73) Assignee: Tekelec, Inc., Morrisville, NC (US)

( * ) Notice: Subject to any disclaimer, the term of this patent is extended or adjusted under 35 U.S.C. 154(b) by 672 days.

(21) Appl. No.: 12/512,971

(22) Filed: Jul. 30, 2009

(65) Prior Publication Data

US 2010/0030914 A1 Feb. 4, 2010

Related U.S. Application Data

(60) Provisional application No. 61/085,389, filed on Jul. 31, 2008.

(51) Int. Cl.
*G06F 15/16* (2006.01)

(52) U.S. Cl.
USPC .......................................... 709/235; 709/203

(58) Field of Classification Search
USPC ................................................ 709/203, 235
See application file for complete search history.

(56) References Cited

U.S. PATENT DOCUMENTS

| | | | |
|---|---|---|---|
| 6,954,784 B2 * | 10/2005 | Aiken et al. ................. | 709/220 |
| 7,292,592 B2 | 11/2007 | Rune | |
| 7,401,217 B2 | 7/2008 | Huang et al. | |
| 7,457,875 B2 | 11/2008 | Wada et al. | |
| 7,471,634 B1 | 12/2008 | Wenzel et al. | |
| 7,613,121 B2 | 11/2009 | Chou et al. | |
| 7,647,403 B2 | 1/2010 | Gray | |
| 7,660,320 B2 | 2/2010 | Wepiwe et al. | |
| 7,672,332 B1 | 3/2010 | Chapman | |
| 7,813,326 B1 | 10/2010 | Kelm et al. | |
| 7,840,699 B2 | 11/2010 | Fujita et al. | |
| 7,855,982 B2 | 12/2010 | Ramankutty et al. | |
| 7,921,290 B2 | 4/2011 | Albert et al. | |

(Continued)

FOREIGN PATENT DOCUMENTS

WO WO 2011/159799 A2 12/2011

OTHER PUBLICATIONS

Moran, "Determining When to Discard or Retry a SIP Request During Overload," SIPPING Working Group, Internet Draft, pp. 1-12 (Mar. 14, 2008).

"SRV Record," Wikipedia, pp. 1-3 (Feb. 25, 2008).

(Continued)

*Primary Examiner* — John B. Walsh
(74) *Attorney, Agent, or Firm* — Jenkins, Wilson, Taylor & Hunt, P.A.

(57) ABSTRACT

Methods, systems, and computer readable media for throttling traffic to an IP network server using alias hostname identifiers assigned to the IP network server with a domain name system are disclosed. One method includes maintaining a plurality of weight values and corresponding alias hostname identifiers for the IP network server that are associated with the IP network server in a DNS system. The method further includes throttling network traffic sent to an IP network server by sending, from the IP network server, messages to nodes that send the traffic to the IP network server, where the messages selectively enable or disable traffic flow to the individual alias hostnames.

24 Claims, 9 Drawing Sheets

(56) References Cited

U.S. PATENT DOCUMENTS

| | | | |
|---|---|---|---|
| 7,944,853 B2 | 5/2011 | Eglin et al. | |
| 7,957,355 B1 | 6/2011 | Heiferling et al. | |
| 8,059,533 B2 | 11/2011 | Andreasen et al. | |
| 8,060,612 B1 | 11/2011 | Mangal et al. | |
| 8,068,408 B2 | 11/2011 | Ansari et al. | |
| 8,089,958 B2 | 1/2012 | Elliott et al. | |
| 8,160,021 B2 | 4/2012 | Ohba et al. | |
| 8,165,143 B2 | 4/2012 | Samajpati | |
| 8,170,055 B2 | 5/2012 | Fang et al. | |
| 8,213,409 B2 | 7/2012 | Rudnick et al. | |
| 8,219,697 B2 | 7/2012 | Langen et al. | |
| 8,223,717 B2 | 7/2012 | Dillon et al. | |
| 2005/0005006 A1* | 1/2005 | Chauffour et al. | 709/223 |
| 2006/0002308 A1 | 1/2006 | Na et al. | |
| 2006/0187829 A1 | 8/2006 | Heiner et al. | |
| 2006/0206706 A1 | 9/2006 | Dietz | |
| 2007/0165613 A1 | 7/2007 | Soo et al. | |
| 2008/0147885 A1* | 6/2008 | Bessis | 709/250 |
| 2008/0151906 A1 | 6/2008 | Kolli et al. | |
| 2008/0178277 A1 | 7/2008 | Oba et al. | |
| 2009/0041043 A1 | 2/2009 | Belling et al. | |
| 2009/0083861 A1 | 3/2009 | Jones | |
| 2009/0185494 A1 | 7/2009 | Li et al. | |
| 2009/0254674 A1* | 10/2009 | Leiden et al. | 709/232 |
| 2009/0265467 A1 | 10/2009 | Peles | |
| 2010/0299451 A1 | 11/2010 | Yigang et al. | |
| 2011/0026460 A1 | 2/2011 | Lafuente Alvarez et al. | |
| 2011/0082940 A1 | 4/2011 | Montemurro et al. | |
| 2011/0238793 A1 | 9/2011 | Bedare et al. | |
| 2011/0314178 A1 | 12/2011 | Kanode et al. | |
| 2012/0005357 A1 | 1/2012 | Hellgren | |
| 2012/0005523 A1 | 1/2012 | Korhonen et al. | |
| 2012/0096177 A1 | 4/2012 | Rasanen | |
| 2012/0134361 A1 | 5/2012 | Wong et al. | |
| 2012/0158995 A1 | 6/2012 | McNamee et al. | |

OTHER PUBLICATIONS

Hilt et al., "Essential Correction to the Session Initiation Protocol (SIP) 503 (Service Unavailable) Response," SIP Working Group, Internet Draft, pp. 1-11 (Jul. 6, 2007).

Rosenberg, "Requirements for Management of Overload in the Session Initiation Protocol," SIPPING, Internet-Draft, pp. 1-14 (Jun. 26, 2006).

Gulbrandsen et al., "A DNS RR for Specifying the Location of Services (DNS SRV)," Network Working Group, pp. 1-12 (Feb. 2000).

Singh et al., "Failover, Load Sharing and Server Architecture in SIP Telephony," Department of Computer Science, Columbia University, pp. 1-18 (Publication Date Unknown).

Notification of Transmittal of the International Search Report and the Written Opinion of the International Searching Authority, or the Declaration for International Application No. PCT/US2009/052316 (Apr. 12, 2010).

Hilt, "SIP Overload Control: Report from the IETF Design Team," Bell-Labs/Alcatel-Lucent, pp. 1-14 (Mar. 2008).

Rosenberg et al., "Session Initiation Protocol (SIP): Locating SIP Servers," RFC 3263, pp. 1-18 (Jun. 2002).

Rosenberg et al., "SIP: Session Initiation Protocol," RFC 3261, pp. 1-270 (Jun. 2002).

Communication of European publication No. and information on the application of Article 67(3) EPC for European Application No. 09803619.7 (Mar. 23, 2011).

Non-Final Official Action for U.S. Appl. No. 13/161,443 (Sep. 12, 2012).

Notice of Allowance and Fee(s) Due for U.S. Appl. No. 13/161,443 (Jun. 18, 2013).

European Search Report for European Patent Application No. 09803619.7 (Apr. 3, 2013).

Communication of European Publication No. and Information on the Application of Article 67(3) EPC for European Patent Application No. 11796367.8 (Mar. 27, 2013).

Notification of Transmittal of the International Search Report and the Written Opinion of the International Searching Authority, or the Declaration for International Patent Application No. PCT/US2011/040525 (Dec. 16, 2011).

Loughney., "Diameter Command Codes for Third Generation Partnership Project (3GPP) Release 5," Network Working Group, RFC 3589 (Sep. 2003).

Calhoun et al., "Diameter Base Protocol," Network Working Group, RFC 3588 (Sep. 2003).

* cited by examiner

```
_sip._tcp.example.com. 86400 IN SRV 10 001 5060 application_server_A1.example.com.
_sip._tcp.example.com. 86400 IN SRV 10 002 5060 application_server_A2.example.com.
_sip._tcp.example.com. 86400 IN SRV 10 004 5060 application_server_A3.example.com.
_sip._tcp.example.com. 86400 IN SRV 10 008 5060 application_server_A4.example.com.
_sip._tcp.example.com. 86400 IN SRV 10 016 5060 application_server_A5.example.com.
_sip._tcp.example.com. 86400 IN SRV 10 032 5060 application_server_A6.example.com.
_sip._tcp.example.com. 86400 IN SRV 10 064 5060 application_server_A7.example.com.
_sip._tcp.example.com. 86400 IN SRV 10 128 5060 application_server_A8.example.com.
_sip._tcp.example.com. 86400 IN SRV 10 254 5060 application_server_B.example.com.
```

METHODS, SYSTEMS, AND COMPUTER READABLE MEDIA FOR THROTTLING TRAFFIC TO AN INTERNET PROTOCOL (IP) NETWORK SERVER USING ALIAS HOSTNAME IDENTIFIERS ASSIGNED TO THE IP NETWORK SERVER WITH A DOMAIN NAME SYSTEM (DNS)

RELATED APPLICATIONS

This application claims the benefit of U.S. Provisional Patent Application Ser. No. 61/085,389 filed Jul. 31, 2008; the disclosure of which is incorporated herein by reference in its entirety.

TECHNICAL FIELD

The subject matter described herein relates to traffic throttling. More specifically, the subject matter relates to methods, systems, and computer readable media for performing traffic throttling.

BACKGROUND

In Internet protocol (IP)-based communications networks, network traffic may be distributed or load-shared among multiple IP network servers. In order to facilitate better understanding and clarity when presenting the subject matter described herein, the embodiments shown and described below refer to session initiation protocol (SIP)-based network traffic being distributed across a plurality of SIP application servers (ASs) using a domain name system (DNS) lookup mechanism. However, it is appreciated that this is not intended to be limiting and that other types of communications networks, protocols, servers, and mechanisms may be used without departing from the scope of the subject matter described herein.

In a SIP network, a SIP proxy may be connected to a plurality of SIP application servers for distributing SIP traffic among the ASs. As used herein, a "SIP proxy" refers to an intermediary device in a SIP network that acts as both a server and a client for the purpose of making requests on behalf of other clients and primarily plays the role of routing messages to one or more associated devices. Also, as used herein, a "SIP AS" refers to an entity in a SIP network that carries out functions not directly related to layer 3 (or lower) routing and determines which SIP application on the server should be used for handling a particular SIP session. Exemplary functions that may be performed by a SIP AS include: session control, call processing language (CPL) services, call forwarding, call logging, presence management, instant messaging, conference services, interactive voice response (IVR) service, registration, prefix matching, and next hop routing.

In order to route traffic to a particular AS, a SIP proxy may query a DNS server to obtain network identity, priority, and other information regarding the network server. For example, a DNS server may maintain records for each of a plurality of application servers and provide the appropriate DNS record in response to a valid DNS query. One DNS record type is a service resource record (SRV RR) which includes information regarding services provided by a network server (e.g., SIP AS). A more detailed description of the SRV RR message type may be found in RFC 2782, which is incorporated by reference herein in its entirety.

During normal operation, network traffic may be distributed/load-shared among multiple network servers by associating a weight factor with each network server specified in a DNS SRV record list and, when the SRV RR is retrieved as part of normal DNS lookup procedures, traffic may be prioritized among the network servers based on their weight factors included in the SRV RR. Conventional DNS records provide a one-to-one association between hostname identifiers and network servers. Therefore, when a DNS query requesting information associated with a network server is sent to a DNS server, the DNS server returns a single hostname identifier for each network server in a DNS SRV record.

Figure 1A:
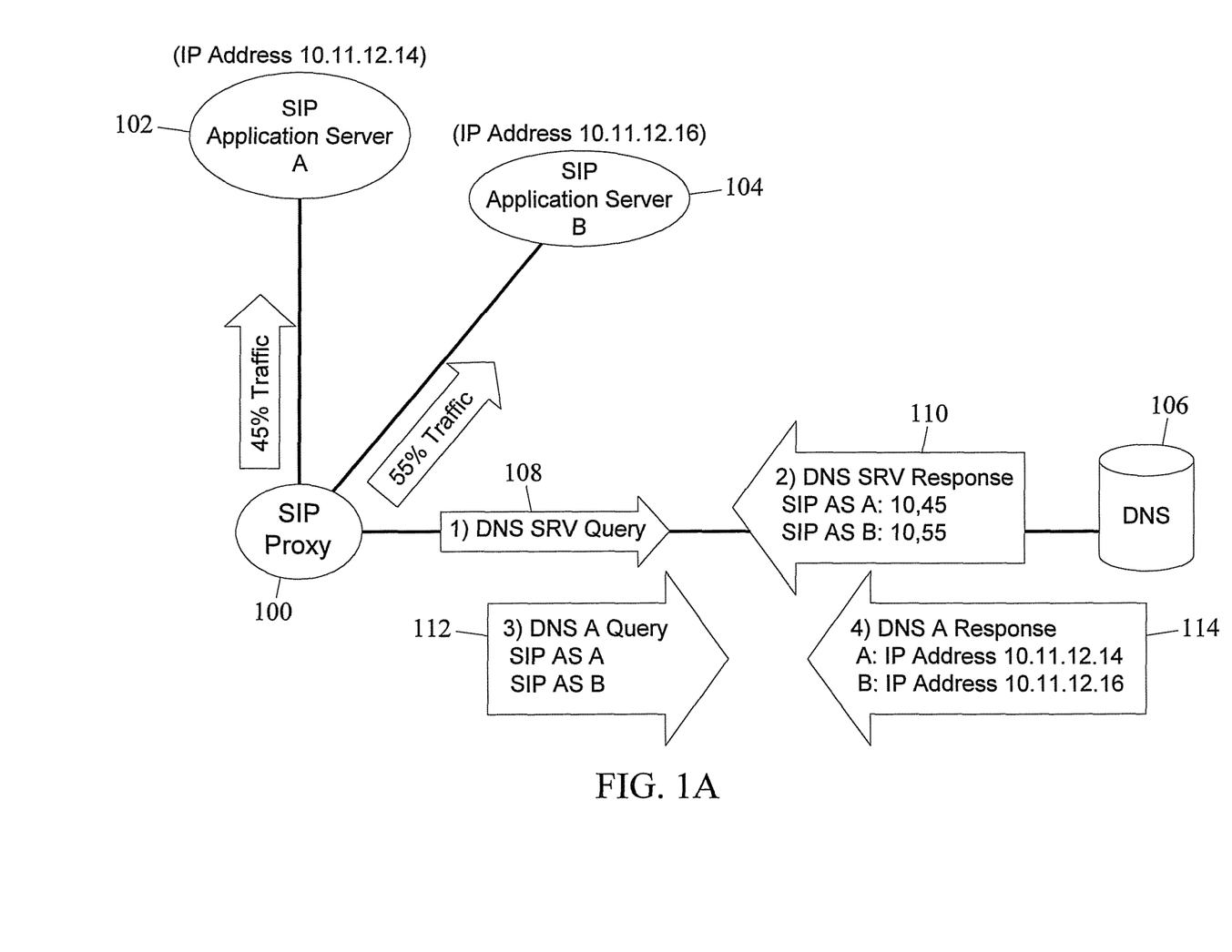
FIG. 1A is a network diagram illustrating a conventional DNS query-based traffic distribution/load-balancing.

For example, in FIG. 1A, a conventional method for distributing/load-sharing network traffic between two different SIP ASs using weighted DNS records is shown. Referring to FIG. 1A, SIP proxy 100 may receive traffic to be load balanced among SIP AS 102 and 104. In order to determine where to route traffic, SIP proxy 100 may query DNS server 106 to obtain priority and weighting information for SIP AS 102 and 104. For example, SIP proxy 100 may send DNS query 108 to DNS server 106. In response, DNS server 106 may provide DNS response 110 that includes an ordered/prioritized list of contact addresses in an SRV record, where the first contact address in the list is the highest priority/most preferred network server and the second contact address in the list is the next most preferred, and so on.

As shown in FIG. 1A, SRV records maintained by DNS server 106 for SIP application server A 102 and SIP application server B 104 include an identical priority value (i.e., 10) for each AS 102 and 104, yet include different weight values of 45 for AS 102 and 55 for AS 104. After SIP proxy 100 has obtained priority and weight values for SIP AS 102 and 104, SIP proxy 100 may issue a second DNS query in order to obtain the IP addresses for each of AS 102 and 104. For example, SIP proxy 100 may issue DNS query 112 and receive DNS response 114 containing the IP addresses of SIP AS 102 and 104. As a result, 45% of traffic flows to AS A 102 and 55% of traffic flows to AS B 104 from the SIP Proxy under normal conditions.

Figure 1B:
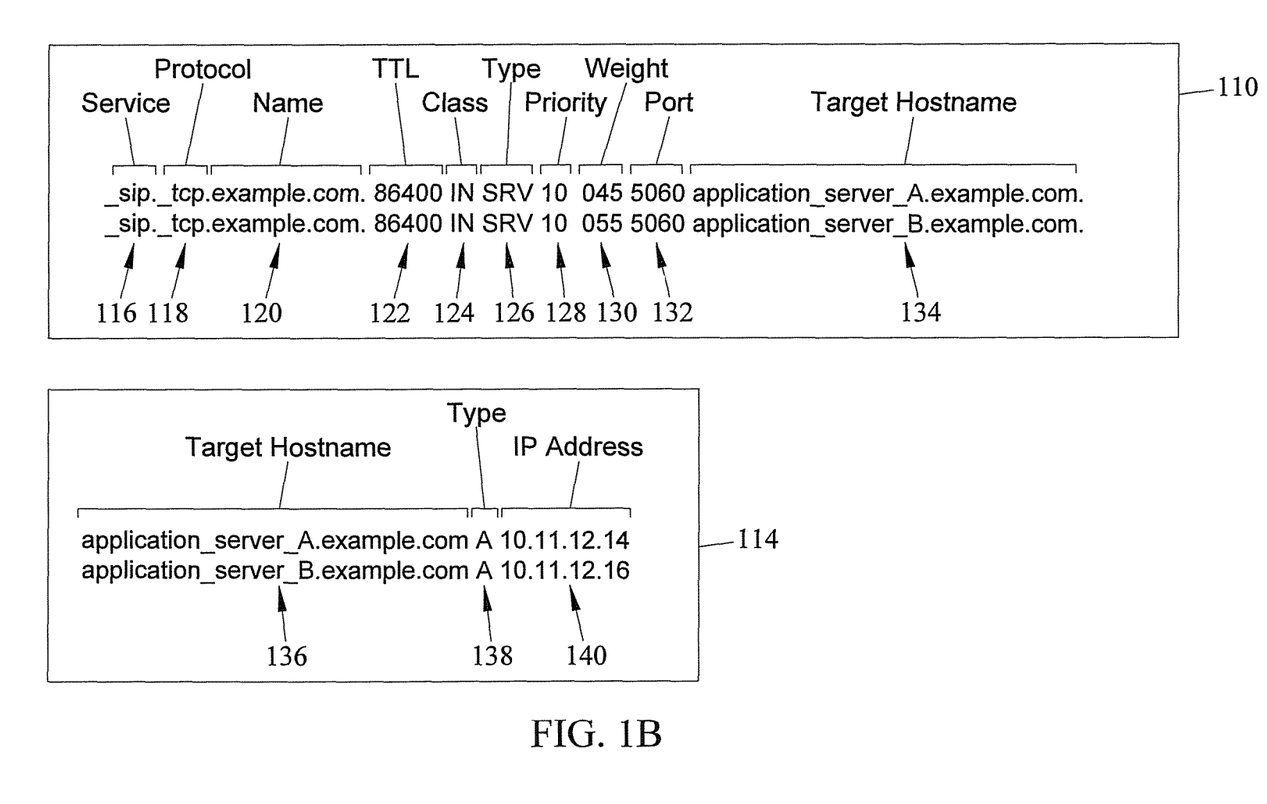
FIG. 1B is an illustration of conventional DNS SRV records that may be used given in response to a conventional DNS query.

FIG. 1B illustrates two types of conventional DNS records that may be provided by DNS server 106 in response to a query for information associated with SIP AS 102 and/or 104. Referring to FIG. 1B, SRV RR 110 may include a plurality of entries, where each entry has a plurality of fields. According to one possible embodiment, SRV RR 110 may have the following format "Service.Protocol.Name TTL Class Type Priority Weight Port Target", where the "Service" field is the symbolic name of the desired service. For example, as shown in FIG. 1B, Service field 116 includes "SIP" indicating that the RR is associated with the session initiation protocol.

The "Protocol" field indicates the symbolic name of the desired protocol of the requested service. Example protocols include, but are not limited to, the transmission control protocol (TCP) and user datagram protocol (UDP). In FIG. 1B, protocol field 118 includes "tcp" indicating that TCP is used.

The "Name" field indicates the domain name for which the RR is valid. In this example, name field 120 includes the domain name "example.com."

The "TTL" field indicates a standard DNS time-to-live value expressed in seconds. It is appreciated that in order to increase efficiency of the domain name system, nameservers are divided into "authoritative nameservers" and "caching nameservers," where the ultimate authority for the validity of data for a particular resource record is set by the authoritative nameserver and a caching nameserver obtains a copy of an authoritative RR from an authoritative nameserver and caches the record for the time specified in TTL field 122. Therefore, if a caching nameserver receives a request for a record before the TTL for that record has expired, the caching server will reply with the cached resource record rather than retrieve it from the authoritative nameserver. The "Class" field indicates a class as defined in RFC 1035, which is incorporated by reference herein in its entirety. For example, class 124 indicates the IN class associated with the Internet.

The "Type" field indicates the DNS record type. Exemplary record types include a service record (SRV), an IPv4 address record type (A), and an IPv6 record type (AAAA) which are also defined in RFC 1035. It is appreciated that other DNS record types suitable for implementing the subject matter described herein may be used without departing from the scope of the subject matter described herein. As shown in FIG. 1B, because DNS record 110 is a service record, type field 126 includes SRV.

The "Priority" field indicates a preference for an entry wherein entries having lower priority values are always preferred over entries having higher priority values. Multiple entries may be associated with the same priority value, in which case, entries may be ordered based on their weights: the priority of the target host, lower value means more preferred. For example, priority field 128 includes identical values (i.e., 10) for each of the first and second entries in RR 110 corresponding to a preference of the first and second entries over entries having higher priority values (not shown).

The "Weight" field indicates a relative weight for records with the same priority, wherein higher weights are preferred over lower weights. For example, weight field 130 of the first entry in RR 110 includes a value of 45 and the second entry includes a weight of 55, corresponding to a relative preference for the second entry.

The "Port" field indicates port on which the requested service indicated in is found. For example, port field 132 includes port 5060 corresponding to tcp protocol indicated in protocol field 118.

The "Target", or "target hostname," field indicates the canonical hostname of the machine providing the service. For example, target hostname field 134 includes a first entry corresponding to SIP AS A 102 that is resolvable to its IP address 10.11.12.14 and a second entry corresponding to SIP AS B 104 resolvable to IP address 10.11.12.16.

Also shown in FIG. 1B, record 114 may be maintained by DNS server 106 that associates SIP application servers 102 and 104 with their respective IP addresses. For example, RR 114 may contain target hostname field 136 corresponding to SIP application servers 102 and 104, type field 138 indicating that DNS record 114 is an address (A) record, and a network/IP address field 140 indicating the network addresses of SIP application servers 102 and 104.

Also, during the congestion or partial failure of one of SIP AS 102 or 104, DNS server 106 may publish records that allow the network to manage failover. For example, in the event of the failure of one of network servers 102 or 104, all traffic to the affected network server is shed and redistributed among the remaining network servers according to the weights/priorities specified in the DNS SRV record list. So, when a network server becomes congested, congesting message traffic will continue to be directed to the network server until failure and, upon failure, send a message to neighboring network devices that it is no longer available. The key point to appreciate is that because the entire processing capacity of the network server is linked to the single hostname identifier provided in the DNS SRV record, the network server may only control the amount of traffic it receives in a binary all-or-nothing approach.

Figure 1C:
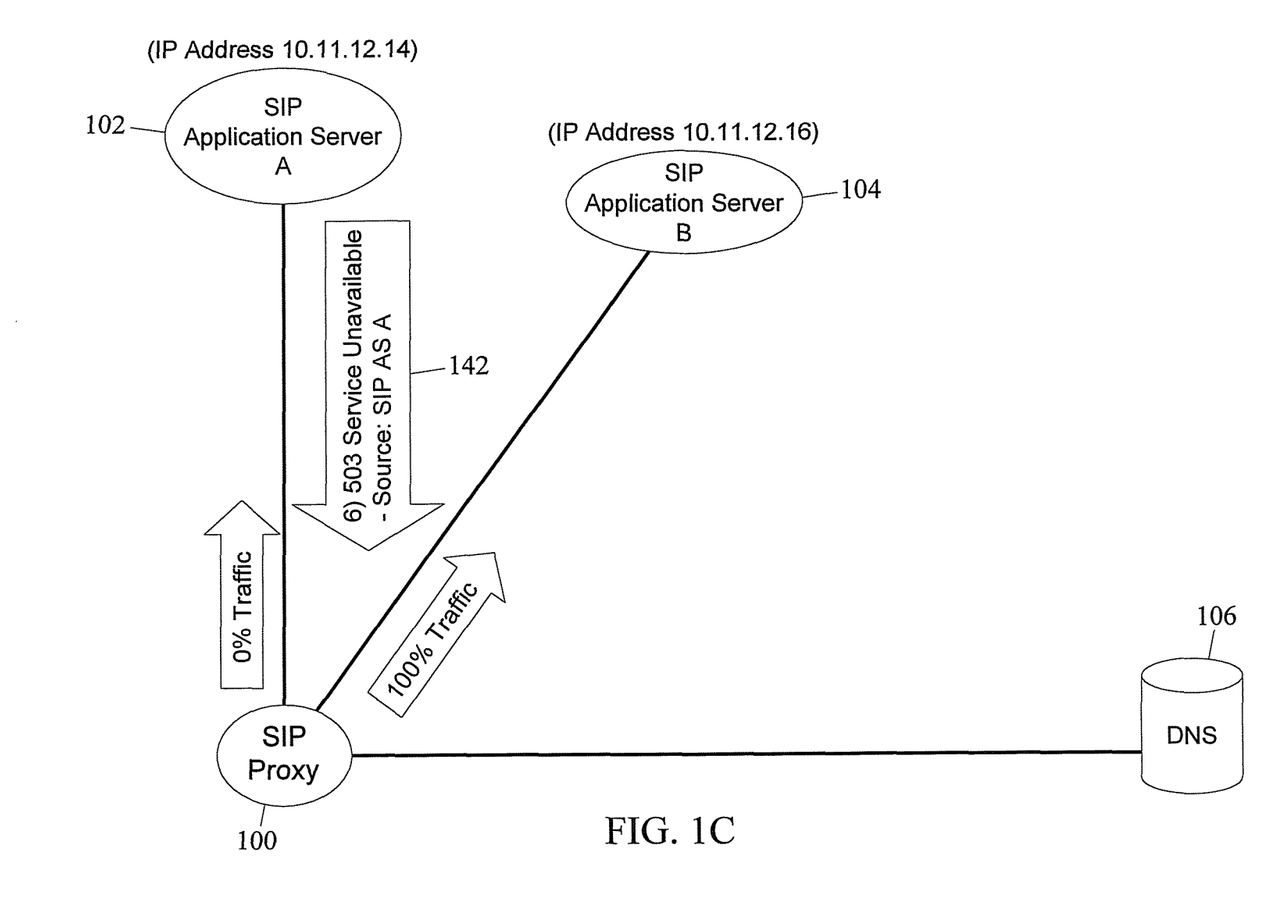
FIG. 1C is a network diagram illustrating a conventional all-or-nothing traffic distribution/load-balancing scheme.

FIG. 1C illustrates the conventional use of DNS records for redistributing network traffic to unaffected network servers during congestion or partial failure of another network server. As shown in FIG. 1C, if SIP AS A 102 becomes severely congested or otherwise unavailable, AS A 102 may notify SIP Proxy 100 that no further traffic should be sent to AS A 102 (until a retry period has expired) by sending a SIP 5xx (Server Error) message to SIP proxy 100. SIP 5xx responses are failure responses given when a server has erred that indicate that the server is temporarily unable to process the request due to a temporary overloading or maintenance of the server. The server may then indicate when the client should retry the request in a Retry-After header field (e.g., a randomly chosen value of between 0 and 10 seconds). If no Retry-After is given, the client acts as if it had received a 500 (Server Internal Error) response which indicates that the server encountered an unexpected condition that prevented it from fulfilling the request. Upon receipt of a 5xx message, SIP proxy 100 directs 100% of its application traffic to AS B 104 as the only remaining AS in the list.

One problem associated with conventional methods for redirecting traffic among network servers in the event of congestion or partial failure of one of the network servers is that it is an all-or-nothing approach. Thus, even though a congested network server may be capable of processing some traffic (but less than its normal load), the DNS response which directs traffic to network servers simply shuts off all traffic to the congested network server. This results in a coarse, and therefore sub-optimal, utilization of network server resources in the event of network server congestion.

As such, a SIP network server would congest until total failure and: (1) only after total failure occurred would traffic be steered away from the server, and (2) once total failure has occurred, all traffic is steered away from the affected server.

Accordingly, in light of these difficulties, a need exists for improved methods and systems for throttling traffic received by/sent to an IP network server using DNS.

SUMMARY

Methods, systems, and computer readable media for throttling traffic to an IP network server using alias hostname identifiers assigned to the IP network server with a domain name system are disclosed. One method includes maintaining a plurality of weight values and corresponding alias hostname identifiers for the IP network server that are associated with the IP network server in a DNS system. The method further includes throttling network traffic sent to an IP network server by sending, from the IP network server, messages to nodes that send the traffic to the IP network server, where the messages selectively enable or disable traffic flow to the individual alias hostnames.

A system for throttling traffic to an IP network server using alias hostname identifiers assigned to the IP network server with a domain name system is also disclosed. The system includes an IP network server. The IP network server includes an association module for maintaining a plurality of weight values and corresponding alias hostname identifiers for the IP network server that are associated with the IP network server in a DNS system. The IP network server further includes a throttling module for throttling network traffic sent to the IP network server by sending, from the IP network server, messages to nodes that send the traffic to the IP network server, where the messages selectively enable or disable traffic flow to the individual alias hostnames.

In one implementation of the subject matter described herein, a DNS record may include a service resource record (SRV RR) maintained by a DNS server such that, when used by a SIP proxy server, may be used to distributed traffic among multiple SIP application servers.

According to another aspect of the subject matter described herein, a system for throttling traffic to an IP network server using alias hostnames assigned to the IP network server with a DNS system is provided. The system includes an Internet protocol (IP) network server with which is associated in a DNS system a plurality of alias hostname identifiers, where each alias hostname identifier is associated with a load-sharing weight value and where the alias hostname identifiers are used by an IP client to send message traffic to the IP network server, wherein the IP network server is adapted to notify the IP client that one of the plurality of alias hostname identifiers is unavailable so that the IP client terminates the flow of message traffic to the affected alias hostname identifier and re-distributes, using the load-sharing weight values of the remaining hostname identifiers, at least a portion of the message traffic previously sent to the affected alias hostname identifier to the remaining alias hostname identifiers associated with the IP network server.

As such, it will be appreciated that one advantage of the present subject matter described herein is that an IP network server (e.g., SIP server, IP multimedia subsystem call session control function, SIP proxy, Presence server, SIP registrar server, location server, home subscriber server, etc.) that implements the subject matter described herein is able to dynamically and autonomously regulate or throttle the amount of traffic that is being directed to it with a much finer degree of control than throttling without assigning plural IP hostname identifiers to a single node and selectively disabling traffic flow to those identifiers.

The subject matter described herein for throttling traffic to an IP network server using alias hostname assigned to the IP network server with a domain name system may be implemented using a computer readable medium having stored thereon computer executable instructions that, when executed by the processor of a computer, perform steps of the aforementioned method. Exemplary computer readable media suitable for implementing the subject matter described herein include disk memory devices, programmable logic devices, and application specific integrated circuits. In one implementation, the computer readable medium may include a memory accessible by a processor. The memory may include instructions executable by the processor for implementing any of the methods for traffic throttling described herein. In addition, a computer readable medium that implements the subject matter described herein may be located on a single device or computing platform or may be distributed across multiple devices or computing platforms.

DEFINITIONS

As used herein, the term "DNS record" refers to information associated with one or more network servers maintained by a DNS server that is configured to provide the information in response to an appropriate DNS query. Exemplary DNS records suitable for use with the present subject matter may include, but are not limited to, service (SRV) resource records and address (A) records. Multiple DNS records may be ordered first by their priority value and secondly by their weight value. As a result, multiple DNS records may be ordered and stored in a DNS record listing.

As used herein, the terms "priority value" or "priority" refer to a server selection mechanism including a numerical value specified in a DNS record, wherein the priority value specifies a preference for entries. Entries having lower priority values are always preferred over entries having higher priority values. Multiple entries may be associated with the same priority value, in which case, entries may be ordered based on their weights.

As used herein, the terms "weight value" or "weight" refer to a server selection mechanism including a numerical value specified in a DNS record, wherein the weight value specifies a relative preference for entries having the same priority. Higher weight values should be given a proportionately higher probability of being selected than lower weight values. A weight value may include a 16 bit unsigned integer expressed in network byte order, therefore having a range from 0-65535.

As used herein, the terms "hostname identifier" or "hostname" refer to an identifier (typically a human-readable name) assigned to a host that uniquely identifies the host on a network, thereby allowing the host to be addressed without using its full IP address. Additionally, a single host may be associated with either a single host name or multiple host names, depending upon the configuration.

As used herein, the terms "alias hostname identifier," "alias hostname," or "alias" refer to a hostname that may not uniquely identify a host on a network. Multiple alias hostnames may be associated with the same IP network server, where each alias hostname may have an individually associated priority and weight value. Thus, multiple alias hostnames may all resolve to the same host IP address. However, there is no standard way to order the use of multiple alias hostnames if they exist.

As used herein, the term "IP network server" includes any type of server that operates in an IP network and that other nodes contact using records obtained by DNS. Exemplary IP network servers for which the subject matter described herein may be implemented include SIP servers, including proxy servers, redirect serves and user agent servers, IMS nodes, such as CSCFs, presence servers, softswitches, message servers, etc.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for traffic throttling using alias hostnames assigned to an IP network server with a domain name system. As mentioned above, conventional DNS records provide a one-to-one association between hostname identifiers and network servers. Therefore, when a DNS query requesting information associated with a network server is sent to a DNS server, the DNS server returns a single hostname identifier for each network server in a DNS SRV record. So, when a network server becomes congested, congesting message traffic will continue to be directed to the network server until failure and, upon failure, send a message to neighboring network devices that it is no longer available. One point to appreciate is that because the entire processing capacity of the network server is linked to the single hostname identifier provided in the DNS SRV record, the network server may only control the amount of traffic it receives in a binary all-or-nothing approach. One problem with this conventional scenario, however, is that while the network server is unavailable, traffic is redistributed among the remaining network servers which may cause them to become overburdened, congested, or unavailable.

Accordingly, the subject matter described herein provides for associating multiple hostname identifiers (herein, "alias hostname identifiers") with a single IP network server (e.g., a SIP server, presence server, message server, voicemail server, softswitch, IMS node, etc.), where each alias hostname identifier may be associated with an individual weight value. Rather than sending a message that indicates its entire processing capacity is unavailable, an IP network server may gracefully throttle down the amount of traffic it receives by sending messages to neighboring devices indicating that one (or more) alias hostnames representing a portion of its total capacity is unavailable. It is appreciated that one advantage of the subject matter described herein includes allowing fine-grained traffic throttling without requiring any changes to conventional DNS or SIP operation. As a result, the time, effort, and expense associated with implementing the subject matter described herein is reduced. The subject matter described herein will now be explained in greater detail with reference to FIGS. 2 through 5 below.

Figure 2:
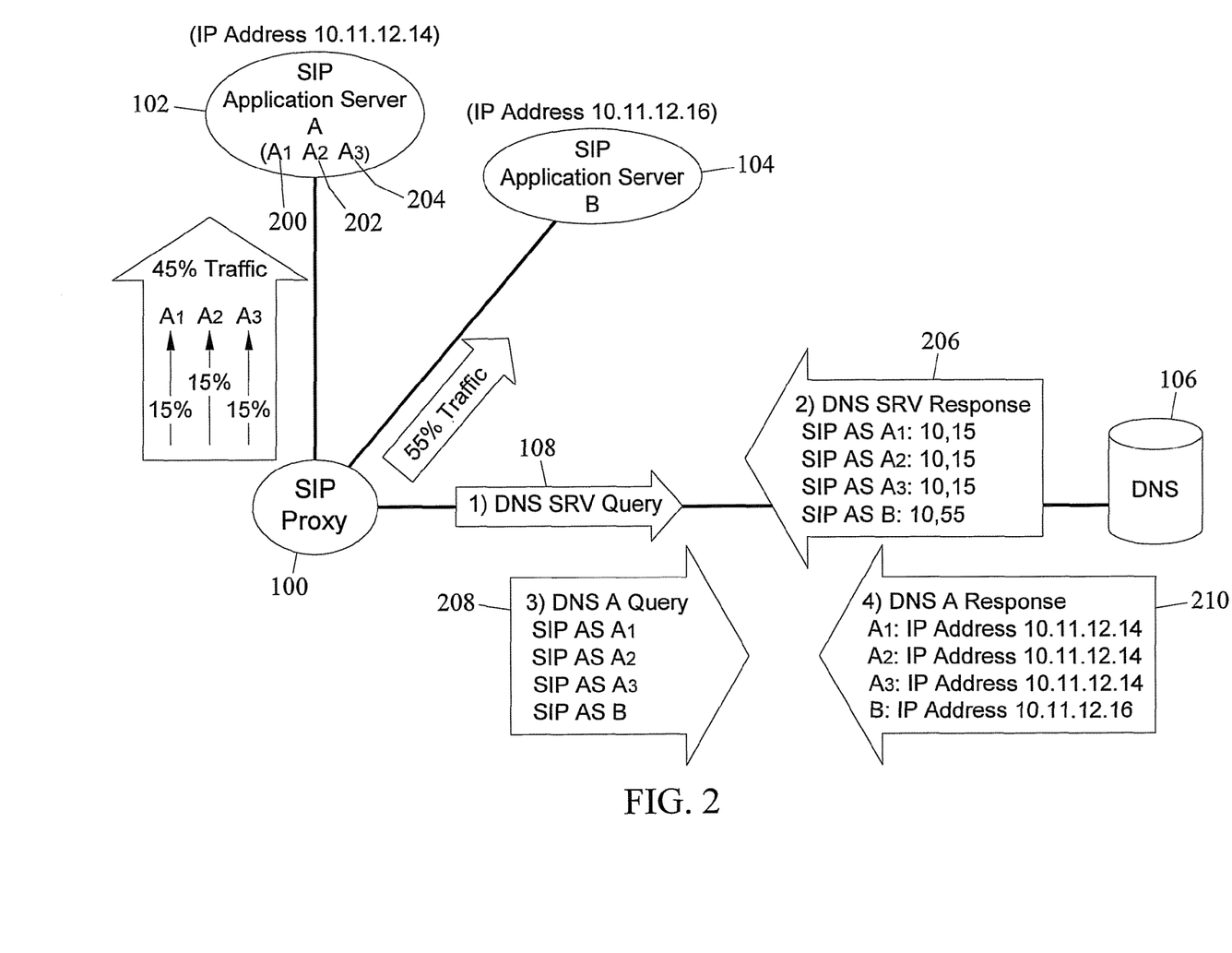
FIG. 2 is an illustration of two exemplary DNS records that may be used for traffic throttling according to an embodiment of the subject matter described herein.

FIG. 2 is a network diagram illustrating traffic distribution/load-balancing according to an embodiment of the subject matter described herein. The traffic distribution scenario illustrated in FIG. 2 is similar to the conventional scenario illustrated in FIG. 1A in that SRV records are provisioned in DNS server 106 for SIP AS A 102 and SIP AS B 104 such that 45% of traffic is directed AS A 102 while 55% of the traffic is directed to AS B 104 under normal conditions.

However, in contrast to FIG. 1A, the 45% share of the traffic directed to AS A 102 is equally divided among three individual alias hostnames $A_1$, $A_2$, and $A_3$ (i.e., 15%, 15%, and 15%), corresponding to alias hostnames 200, 202, and 204, respectively. This may be accomplished by including separate entries in DNS record 206 for each of the plurality of alias hostname identifiers. For example, DNS SRV record 206 may include alias hostname identifier $A_1$ having a weight value of 15, alias hostname identifier $A_2$ having a weight value of 15, and alias hostname identifier $A_3$ also having a weight value of 15. Hostname identifier B may remain untouched and may have a weight value of 55.

When traffic arrives at SIP proxy 100 that must be distributed among SIP ASs A 102 and B 104, SIP proxy 100 may query DNS server 106 to obtain IP address and weight information associated with each hostname identifier that resolves to SIP AS A 102 and B 104. This process may include a two-step process where hostname identifiers and weight values are obtained in response to a first query and corresponding IP addresses are obtained using a second query. For example, SIP proxy 100 may first send DNS SRV query 108 to DNS server 106 and receive, in response, DNS SRV response 206 including three alias hostname identifiers associated with SIP AS A 102 (i.e., $A_1$, $A_2$, and $A_3$) and one hostname identifier for AS B 104 (i.e., B). Next, SIP proxy 100 may send DNS A query 208 to DNS server 106 requesting IP address information for each of the alias hostname identifiers included in DNS SRV response 206. Because alias hostnames $A_1$, $A_2$, and $A_3$ each correspond to SIP AS A 102, which is associated with IP address 10.11.12.14, DNS A response 210 may therefore include the same IP address (i.e., 10.11.12.14) for each of alias hostnames $A_1$, $A_2$, and $A_3$. IP address 10.11.12.16 may be associated with hostname B 104.

After receiving IP address and weight information corresponding to alias hostnames $A_1$, $A_2$, and $A_3$ and hostname B, SIP proxy 100 may distribute traffic to hostnames and alias hostnames based on their corresponding weights. For example, 55% of traffic may be distributed to AS B 104, and 45% of the traffic directed to AS A 102 may be equally divided between alias hostnames $A_1$, $A_2$, and $A_3$ (i.e., 15%, 15%, and 15%), corresponding to alias hostnames 200, 202, and 204, respectively. As mentioned above, one advantage of the subject matter described herein is that it does not require any changes to normal DNS operation/architecture.

Figure 3:
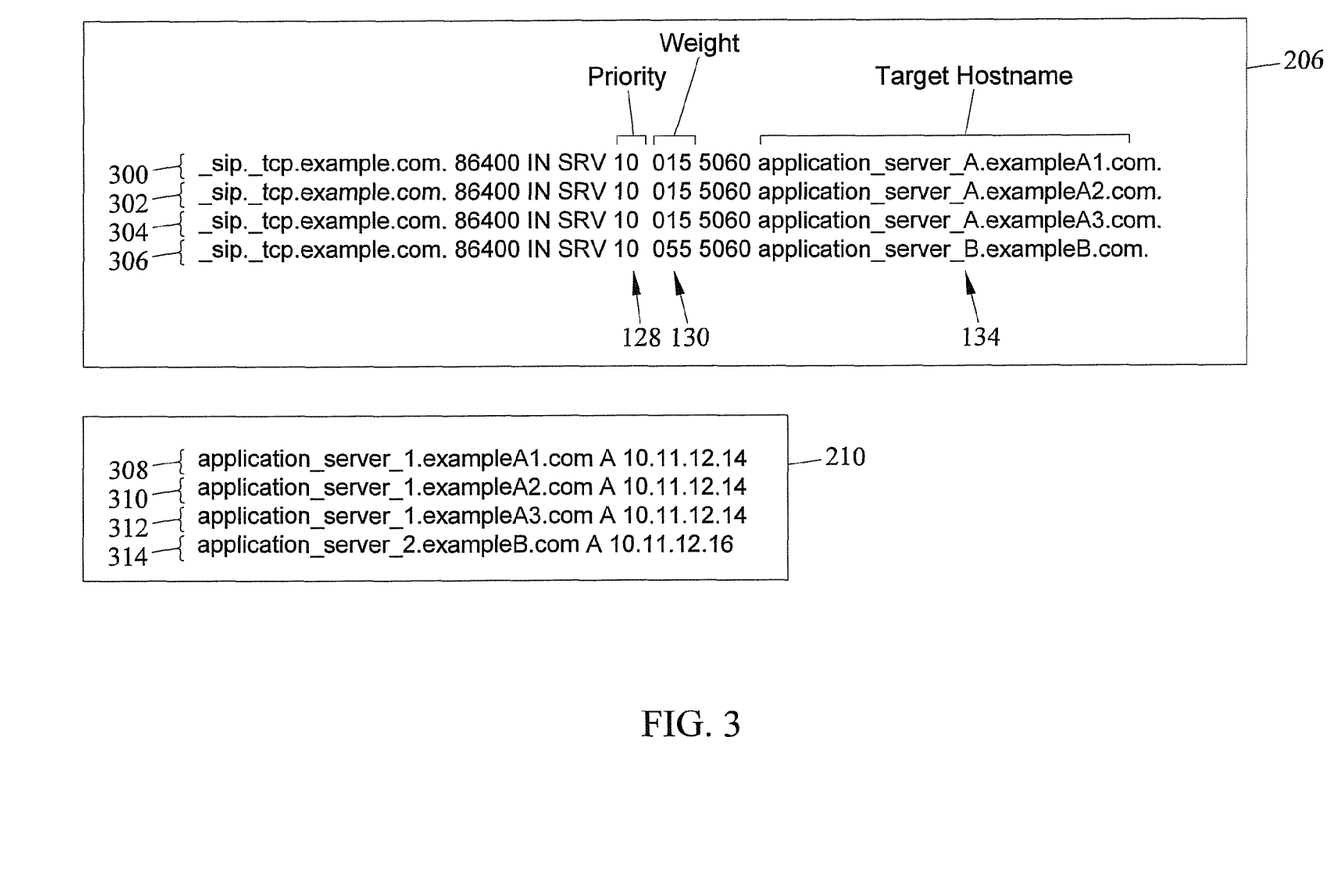
FIG. 3 is a network diagram illustrating traffic throttling according to an embodiment of the subject matter described herein.

FIG. 3 is a more detailed illustration of an exemplary DNS SRV record and an exemplary DNS A record used for providing traffic throttling according to an embodiment of the subject matter described herein. Referring to FIG. 3, DNS SRV record 206 may include multiple alias hostnames associated with the same IP network server (e.g., SIP AS A 102). For example, entries 300, 302, and 304 may be associated with alias hostnames $A_1$, $A_2$, and $A_3$, respectively. Specifically, entry 300 includes target alias hostname "application_server_A.exampleA1.com" indicating that alias hostname A1 is associated with AS A 102. Entries 302-306 follow the same format.

Likewise, DNS A record 210 may include entries for each alias hostname. However, rather than providing weight and other information that is provided in SRV record 206, A record 210 may be used for obtaining IP address information. For example, according to entry 308, alias hostname "application_server_A.exampleA1.com" may be associated with IP address 10.11.12.14. According to entry 310, alias hostname "application_server_A.exampleA2.com" may also be associated with IP address 10.11.12.14. According to entry 312, alias hostname "application_server_A.exampleA3.com" may also be associated with IP address 10.11.12.14. Finally, according to entry 210, IP address 10.11.12.16 may be associated with SIP AS B 104.

During normal operation (i.e., IP network servers 102 and 104 are operating at normal capacity), exemplary DNS records 206 and 210 may produce the same traffic distribution as conventional DNS records when interpreted by SIP proxy 100. However, in the event of congestion or partial failure of SIP AS A 102, DNS records 206 and 210 may be used to throttle the network traffic received by SIP AS A 102. It is appreciated that in addition to congestion or partial failure scenarios, the disclosed methods and systems for traffic throttling may be applied to any condition a server might encounter that would lead it to want to shed load, which may not be limited to a congestion state, without departing from the scope of the subject matter described herein. For example, in some scenarios, a server may proactively shed load before and error or other condition occurs. However, for sake of simplicity of illustration, server congestion scenarios are described hereinbelow. An exemplary congestion scenario is illustrated below with respect to FIG. 4.

Figure 4:
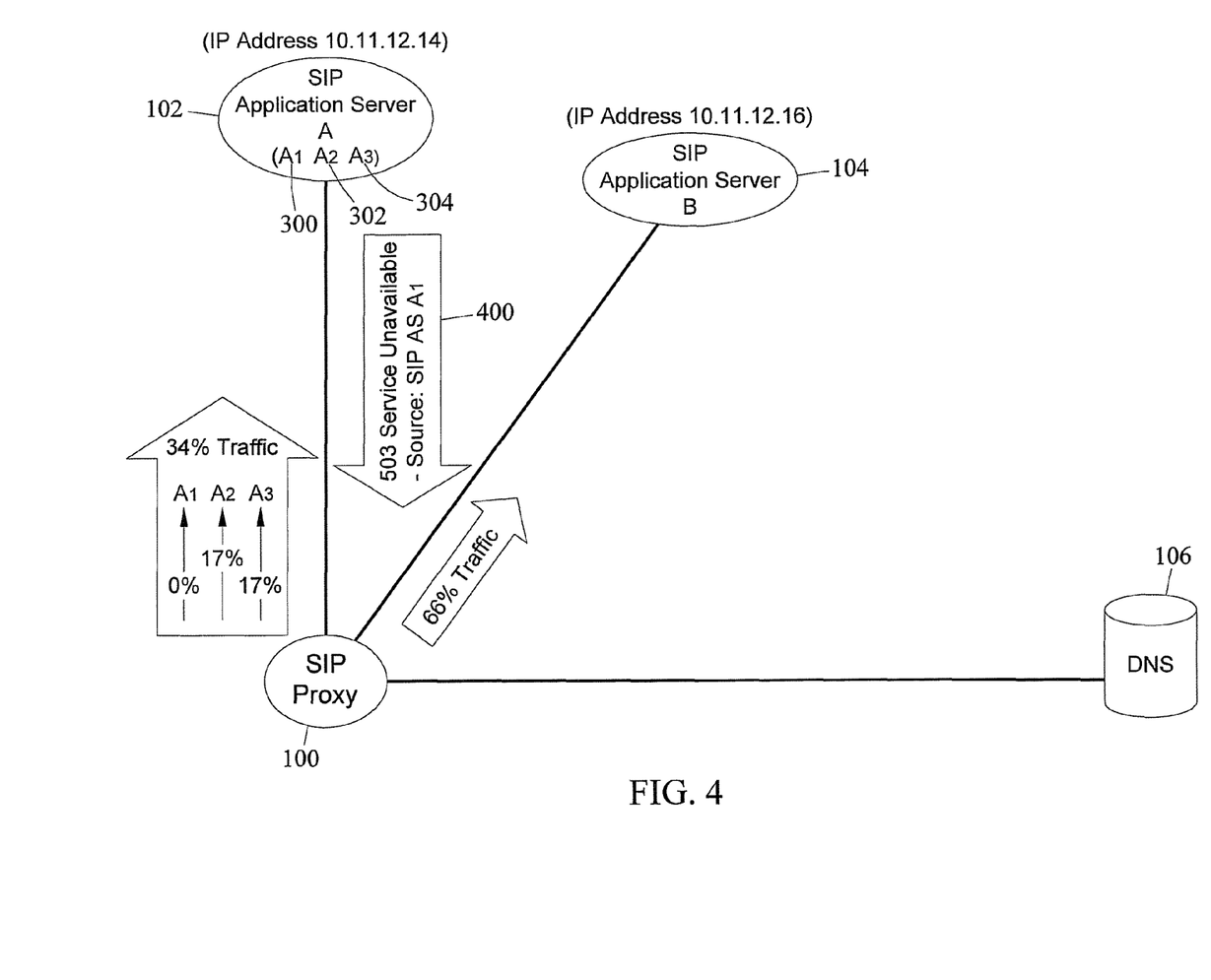
FIG. 4 is a network diagram illustrating traffic throttling according to an embodiment of the subject matter described herein.

FIG. 4 is a network diagram illustrating traffic throttling according to an embodiment of the subject matter described herein. Referring to FIG. 4, in the event that SIP AS A 102 becomes congested or fails, AS A 102 may issue a 5xx error response message 400 including a Retry-After field for one (or more) of alias hostname identifiers $A_1$ 300, $A_2$ 302, or $A_3$ 304. In the example shown, SIP AS A 102 may determine that it is congested and generate 503 Service_Unavailable message 400 indicating source address AS $A_1$ 300 and send it to SIP proxy 100.

In response to receiving 503 Service_Unavailable message 400 indicating a congestion or failure of $A_1$ 300, SIP Proxy 100 may cease directing the 15% of application traffic previously allocated to AS $A_1$ 300 and re-distribute it among the remaining network servers (e.g., $A_2$, $A_3$, and B). In this example, re-normalization of the load-sharing distribution may result in $A_2$ 302 receiving approximately 17% of the traffic, $A_3$ 304 receiving approximately 17% of the traffic, and B 104 receiving approximately 66% of the traffic. It will be appreciated that other algorithms may be used to re-distribute traffic across the remaining available target hosts when one or more of the target hosts become unavailable without departing from the scope of the subject matter described herein.

It may be appreciated from the example described above that the subject matter described herein provides for a SIP AS to more finely control the flow of traffic it receives. As opposed to the previous all-or-nothing approach, the subject matter described herein permits potentially very fine controlled throttling of traffic to an application server. The present subject matter is relevant to any protocol and any network server that is accessed via DNS service.

Figure 5:
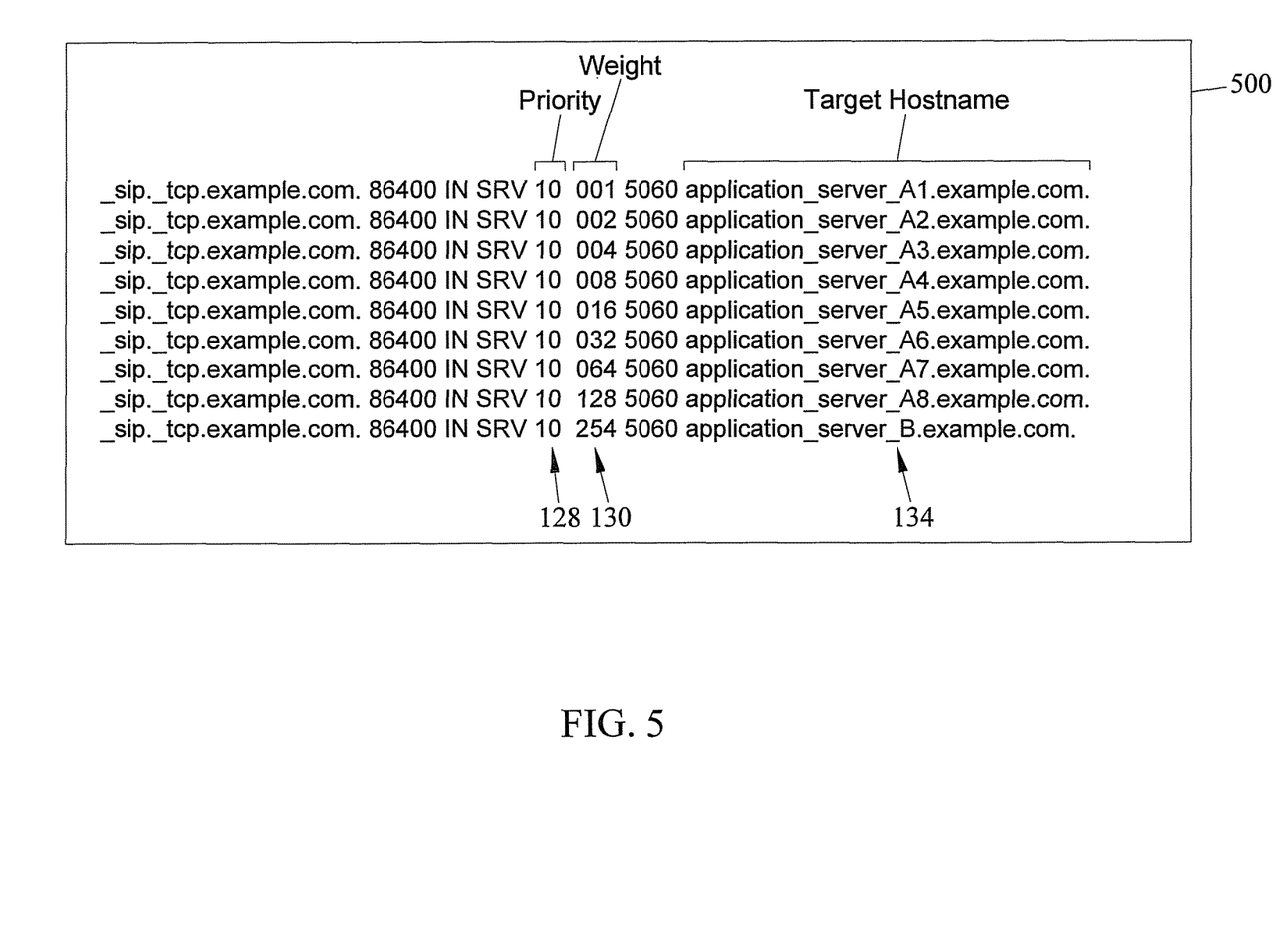
FIG. 5 is an illustration of two exemplary DNS records that may be used for traffic throttling according to an embodiment of the subject matter described herein.

FIG. 5 is an illustration of an alternative DNS SRV record that may be used for traffic throttling according to an embodiment of the subject matter described herein. Specifically, both the number of alias hostnames associated with a particular AS and the weight values associated with each alias in the DNS record may be tuned for providing maximum traffic granularity with minimum DNS record size. For example, it may be appreciated by one of skill in the art that more finely grained traffic throttling can be achieved simply by associating a larger number of alias hostnames with each AS in a DNS SRV record. It is further appreciated that if each record is associated with a unique weight value, and that each weight value is an integer value ranging from 1-255, the theoretical maximum granularity in a DNS record is 1 in 255. Thus, a naïve approach to achieving maximum granularity would be to associate 255 individual alias hostnames with each host, thereby creating 255 separate entries in the DNS record for each host. However, a significant problem with this approach is that the size of the DNS record would become cumbersomely large and inefficient to search.

A more compact DNS SRV record configuration scheme capable of providing maximum traffic throttling granularity is shown in FIG. 5, wherein eight entries are associated with each host, each entry having a weight value corresponding to $2^n$ (n=0,1,2,3,4,5,6,7). By using this scheme, AS A 102 may indirectly control its inbound message traffic load by selectively "disabling" none, all, or various combinations of the alias target hostnames (via the sending of 5xx error messages) in a manner that provides traffic throttle control in 1/255 increments. Using the DNS SRV record configuration scheme illustrated in FIG. 5, AS B 104 should receive (on average) ½ the traffic and AS A 102 should receive ½ the traffic under normal conditions. Thus, only eight DNS records are required (as opposed to 256) with respect to AS A 102 in order to provide traffic control granularity of 1 in 255. Accordingly, a high degree of traffic throttling control can be achieved via implementations of the present invention utilizing a relatively small number of DNS SRV records. However, it is appreciated that in addition to the optimal weighting distribution scheme described above, other weighting distributions may also be used without departing from the scope of the subject matter described herein. For example, the use of unequal weights for various alias hostname identifiers associated with a host for optimizing the ability to shed load in small increments is intended to be within the scope of the subject matter described herein. This may include, but is not limited to, $(2^n)+1$, a Fibonacci sequence, or any other weighting scheme that may provide substantially the same benefit as the $2^n$ weighting scheme described above.

Figure 6:
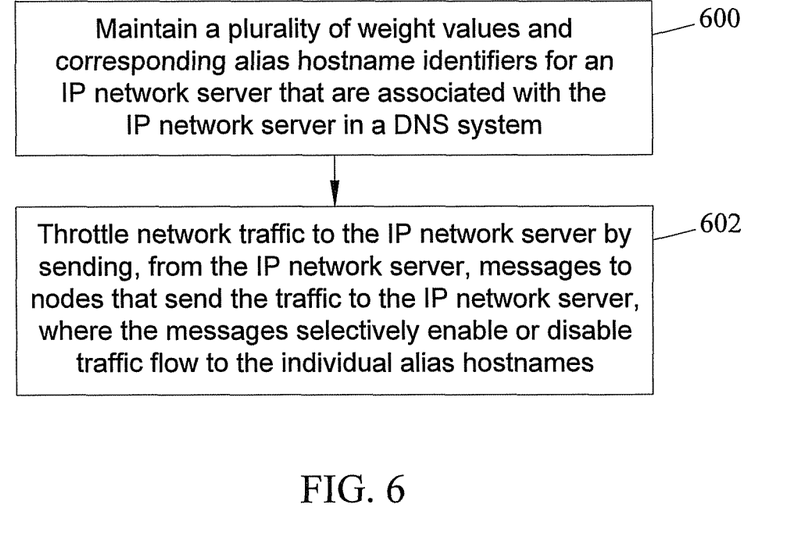
FIG. 6 is a flow chart illustrating exemplary steps for traffic throttling according to an embodiment of the subject matter described herein.

FIG. 6 is a flow chart illustrating exemplary steps for traffic throttling according to an embodiment of the subject matter described herein. Referring to FIG. 6, in step 602, a plurality of weight values and corresponding alias hostname identifiers for the IP network server that are associated with the IP network server in a DNS system is maintained. For example, alias hostnames $A_1$, $A_2$, and $A_3$ and corresponding weight values may all be associated with SIP AS A 102 in a DNS system. SIP AS A 102 may maintain the alias hostnames and the weights in its memory so it can use the message to control the flow of traffic that other nodes send to the different hostnames.

In step 602, network traffic sent to the IP network server is throttled, by sending, from the IP network server, messages to nodes that send the traffic to the IP network server, where the messages selectively enable or disable traffic flow to the individual alias hostnames. For example, during normal conditions, SIP proxy 100 may direct 15% of network traffic to each of alias hostnames $A_1$, $A_2$, and $A_3$, (i.e., 45% going to SIP AS A 102). During congested conditions, SIP AS A 102 may send a message to SIP proxy 100 to disable the traffic flow to hostname $A_1$, and, in response, SIP proxy 100 may throttle the amount of network traffic sent to SIP AS A 102 by ceasing sending of traffic to alias hostname $A_1$, accounting for 15% of the total, and re-distributing it among the remaining available IP network servers and/or alias hostnames.

Figure 7:
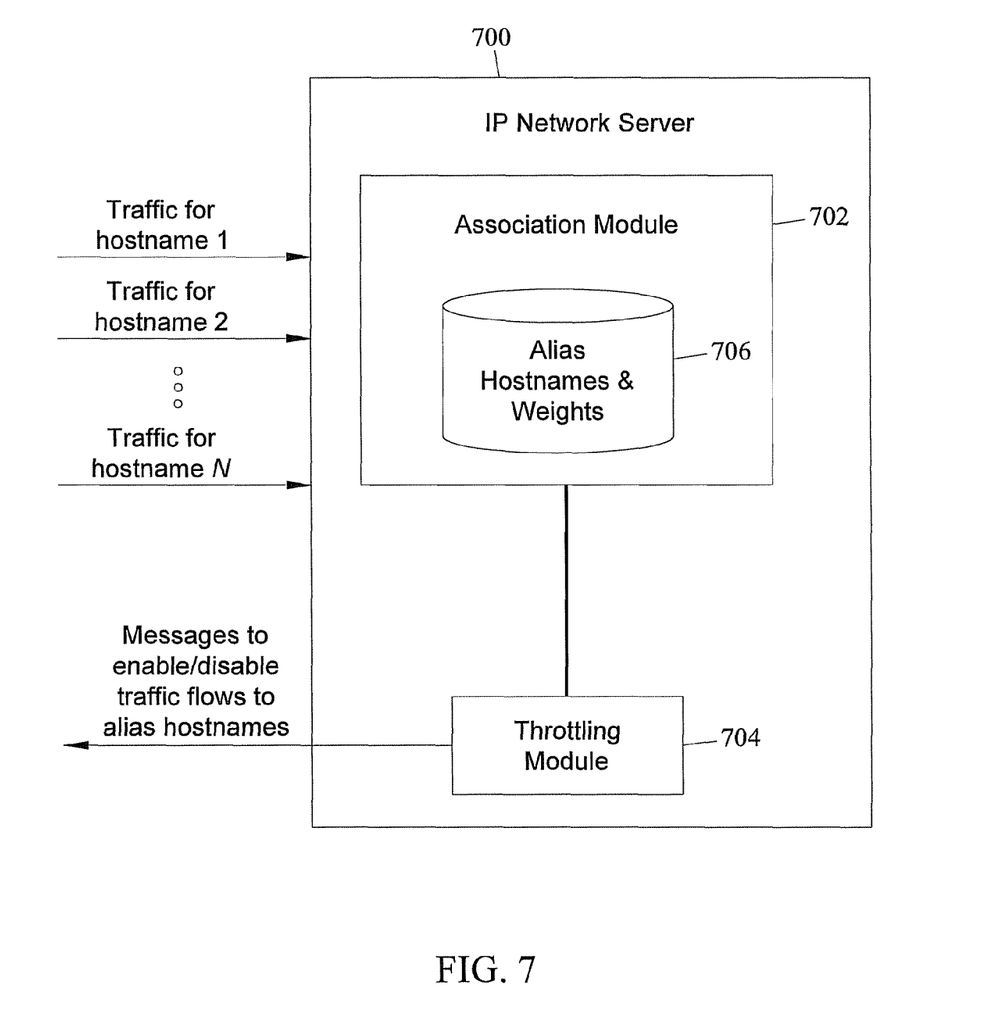
FIG. 7 is a block diagram of an IP network server that implements traffic throttling according to an embodiment of the subject matter described herein.

FIG. 7 is a block diagram of an exemplary IP network server that implements DNS-based traffic throttling according to an embodiment of the subject matter described herein. Referring to FIG. 7, IP network server 700 includes an association module 702 and a throttling module 704. Association module 702 maintains in alias hostname store 704 the alias hostnames and weights that are assigned to IP network server 700 in a DNS system (not shown in FIG. 7). Throttling module 704 throttles traffic to IP network server 700 by sending messages to nodes that send traffic to IP network server 700 to selectively enable and disable traffic flow to the individual IP hostnames. For example, IP network server 700 may send messages to nodes to disable traffic flows to IP hostname 1, which causes traffic directed to that hostname to be re-directed to other IP hostnames associated with IP network server 700 and other nodes. By assigning plural IP hostnames to a single IP network server and selectively enabling and disabling traffic to IP hostnames, fine grained traffic control can be achieved without requiring modification of the DNS records maintained by the DNS system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for throttling traffic to an Internet protocol network server using domain name system (DNS) alias hostname identifiers, the method comprising:
maintaining a plurality of weight values and corresponding alias hostname identifiers for an IP network server that are associated with the IP network server in a DNS system, wherein two or more of the alias hostname identifiers associated with the IP network server resolve to the same host IP address and port combination associated with the IP network server and wherein each of the two or more alias hostname identifiers represents a portion of the total processing capacity of the IP network server; and
throttling network traffic sent to the IP network server by sending, from the IP network server, messages to nodes that send the traffic to the IP network server, where the messages selectively enable or disable traffic flow from the nodes to individual alias hostname identifiers of the two or more alias hostname identifiers, and wherein throttling network traffic sent to the IP network server includes increasing or decreasing the traffic sent to the IP network server by the portion of the total processing capacity of the IP network server represented by the two or more alias hostname identifiers.

2. The method of claim 1 wherein the DNS record includes one of a service resource record (SRV RR) and an address (A) record.

3. The method of claim 1 wherein the IP network server includes a session initiation protocol (SIP) server.

4. The method of claim 1 comprising distributing network traffic to the IP network server based on the weight values associated with the two or more alias hostname identifiers.

5. The method of claim 1 comprising:
at the IP network server:
detecting congestion of the IP network server; and
generating an indication of congestion including one of the two or more alias hostname identifiers.

6. The method of claim 5 wherein generating an indication of congestion includes generating a SIP 5xx server error response message including a retry-after header field and which is associated with one of the two or more alias hostname identifiers.

7. The method of claim 1 wherein associating a weight value with each of the two or more alias hostnames includes associating a different weight value for each of the two or more alias hostnames, wherein the different weight values include values $2^n$, wherein n is an integer.

8. The method of claim 1 comprising selectively enabling and disabling individual alias hostname identifiers.

9. The method of claim 1 comprising dividing the flow of message traffic to the IP network server into N increments, wherein a number of the weight values is less than N.

10. The method of claim 1 wherein the IP network server comprises one of: a SIP server, a presence server, a message server, a voicemail server, a softswitch, and an IMS node.

11. A system for throttling traffic to an Internet protocol (IP) network server using alias hostname identifiers assigned to the IP network server with a domain name system (DNS), the system comprising:
an IP network server, the IP network server including:
an association module embodied in a non-transitory computer readable medium and configured to maintain a plurality of weight values and corresponding alias hostname identifiers for the IP network server that are associated with the IP network server in a DNS system, wherein two or more of the alias hostname identifiers associated with the IP network server resolve to the same host IP address and port combination associated with the IP network server and wherein each of the two or more alias hostname identifiers represents a portion of the total processing capacity of the IP network server; and
a throttling module embodied in a non-transitory computer readable medium and configured to throttle network traffic sent to the IP network server by sending, from the IP network server, messages to nodes that send the traffic to the IP network server, where the messages selectively enable or disable traffic flow from the nodes to individual alias hostname identifiers of the two or more alias hostname identifiers, and wherein the throttling module is configured to throttle network traffic sent to the IP network server by increasing or decreasing the traffic sent to the IP network server by the portion of the total processing capacity of the IP network server represented by the two or more alias hostname identifiers.

12. The system of claim 11 wherein the DNS record includes one of a service resource record (SRV RR) and an address (A) record.

13. The system of claim 11 wherein the IP network server includes a session initiation protocol (SIP) application server.

14. The system of claim 11 wherein throttling network traffic sent to the IP network server includes distributing network traffic to the IP network server based on the weight values associated with the two or more alias hostname identifiers.

15. The system of claim 11 wherein the IP network server is configured to detect congestion of the IP network server and, in response, generate an indication of congestion including one of the two or more alias hostname identifiers.

16. The system of claim 15 wherein the IP network server is configured to generate a SIP 5xx server error response message including a retry-after header field and which is associated with one of the two or more alias hostname identifiers.

17. The system of claim 11 wherein the DNS record associates a different weight value for each of the alias hostname identifiers, wherein the different weight values include values $2^n$, wherein n is an integer.

18. The system of claim 11 wherein the IP network server is configured to selectively enable and disable individual alias hostname identifiers.

19. The system of claim 11 comprising a communications module configured to receive a DNS query requesting information about the IP network server and, in response, to provide the DNS record containing the information.

20. The system of claim 19 wherein the communication module is located at a DNS server.

21. The system of claim 11 wherein the throttling module is located at a session initiation protocol (SIP) proxy.

22. The system of claim 11 wherein the DNS record associates W unequal weight values for at least some of the alias hostname identifiers such that the flow of message traffic to the IP network server is divided into N increments, wherein W is less than N.

23. The system of claim 11 wherein the IP network server comprises one of: a SIP server, a presence server, a message server, a voicemail server, a softswitch, and an IMS node.

24. A non-transitory computer readable medium having stored thereon computer executable instructions that when executed by the processor of a computer perform steps comprising:

maintaining a plurality of weight values and corresponding alias hostname identifiers for an IP network server that are associated with the IP network server in a DNS system, wherein two or more of the alias hostname identifiers associated with the IP network server resolve to the same host IP address and port combination associated with the IP network server and wherein each of the two or more alias hostname identifiers represents a portion of the total processing capacity of the IP network server; and     throttling network traffic sent to the IP network server by sending, from the IP network server, messages to nodes that send the traffic to the IP network server, where the messages selectively enable or disable traffic flow to the individual alias hostname identifiers of the two or more alias hostname identifiers, and wherein throttling network traffic sent to the IP network server includes increasing or decreasing the traffic sent to the IP network server by the portion of the total processing capacity of the IP network server represented by the two or more alias hostname identifiers.

\* \* \* \* \*